No. 80,386. PATENTED JULY 28, 1868.
C. BURLEIGH.
DRILL HOLDER.
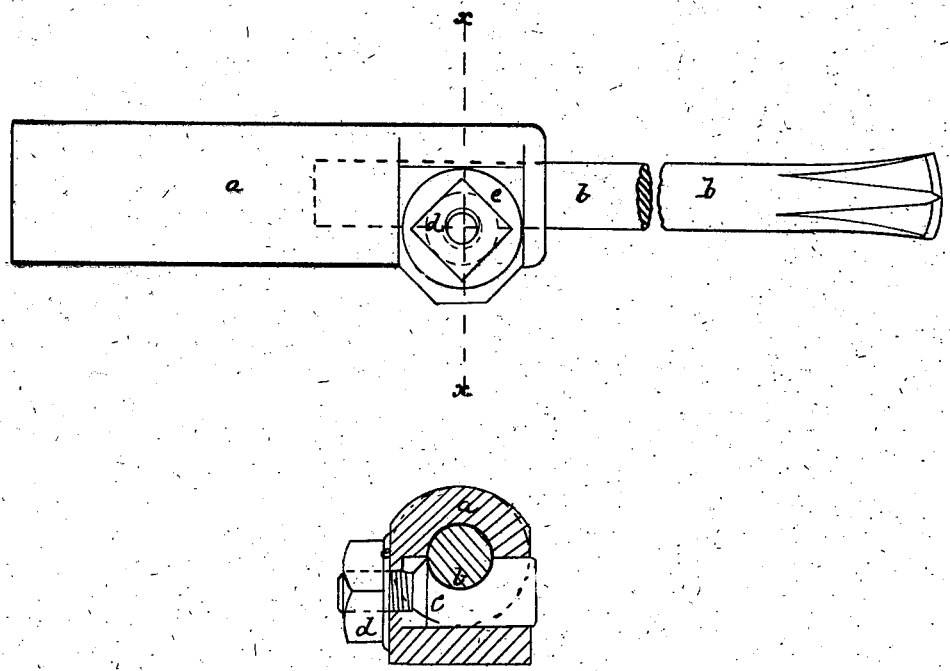

United States Patent Office.

CHARLES BURLEIGH, OF FITCHBURG, MASSACHUSETTS.

Letters Patent No. 80,386, dated July 28, 1868.

---

IMPROVED DRILL-HOLDER.

---

The Schedule referred to in these Letters Patent and making part of the same.

---

TO ALL WHOM IT MAY CONCERN:

Be it known that I, CHARLES BURLEIGH, of Fitchburg, in the county of Worcester, and State of Massachusetts, have invented an Improved Holder or Chuck for holding such drills as are used in stone-drilling machines; and I do hereby declare that the following, taken in connection with the drawings which accompany and form part of this specification, is a description of my invention sufficient to enable those skilled in the art to practise it.

The drills used in stone-drilling machines have been variously secured in mandrels carrying them, as, for example, screw-threads have been cut upon the butt of the drill, which has then been screwed into the screw-tapped hole made in the mandrel, or the drill has been keyed in the mandrel, and various other devices have been employed, all of which have failed, to a greater or less extent, in firmly holding together the drill and mandrel, under the concussions resulting from the violent and rapid blows given by the drill upon a material so little yielding as stone.

The drawings are in illustration of an embodiment of my invention—

Figure 1 being a side view of a mandrel provided with my improved holder for the drill, and Figure 2 being a cross-section of the mandrel and drill, taken through the chuck or holding-device on the line $xx$, fig. 1.

The mandrel, $a$, is bored concentrically with its axis, to fit the butt of the drill, $b$, which is intended to bottom in the hole drilled in the mandrel, as is shown in dotted lines in fig. 1.

The end of the mandrel is enlarged, to compensate for loss of material, removed by a transverse bore intersecting the longitudinal bore, and in the transverse bore is fitted a plug or cylinder, $c$, which at one end is made as a screw, provided with the nut $d$.

In making my improved chuck or holder, I make the hole for the plug $c$, and fit the plug in the hole before I drill out the longitudinal hole, so that a portion of plug $c$ has formed in its body a portion of the outline of the hole in which the drill-butt fits.

Now, it will be seen, that, after the drill is placed in the longitudinal hole, a very slight endwise movement of the plug $c$, occasioned by tightening the nut $d$, will bind the drill-shank, almost beyond possibility of accidental removal.

To guard against the loosening of the nut $d$, by turning, under the influence of the jars or shocks on the drill, I slightly bend the steel washer $e$, so that it may act as a spring under the nut, the effect of which is to prevent the nut from loosening.

Instead of bending the washer, I sometimes seat it on a sub-washer of leather, which has a yielding property, which serves the purpose of the bent spring-washer.

I claim a drill-holding chuck, constructed with a transverse plug crossing the socket-hole for the drill-butt, having a portion of the transverse plug, corresponding with the perimeter of the socket-hole, removed, and having a screw and nut, or equivalent means, for giving endwise movement to the plug, all substantially as and for the purpose set forth.

CHARLES BURLEIGH.

Witnesses:
HILAND C. HITCHCOCK
J. M. GRAHAM.